Figure 1:
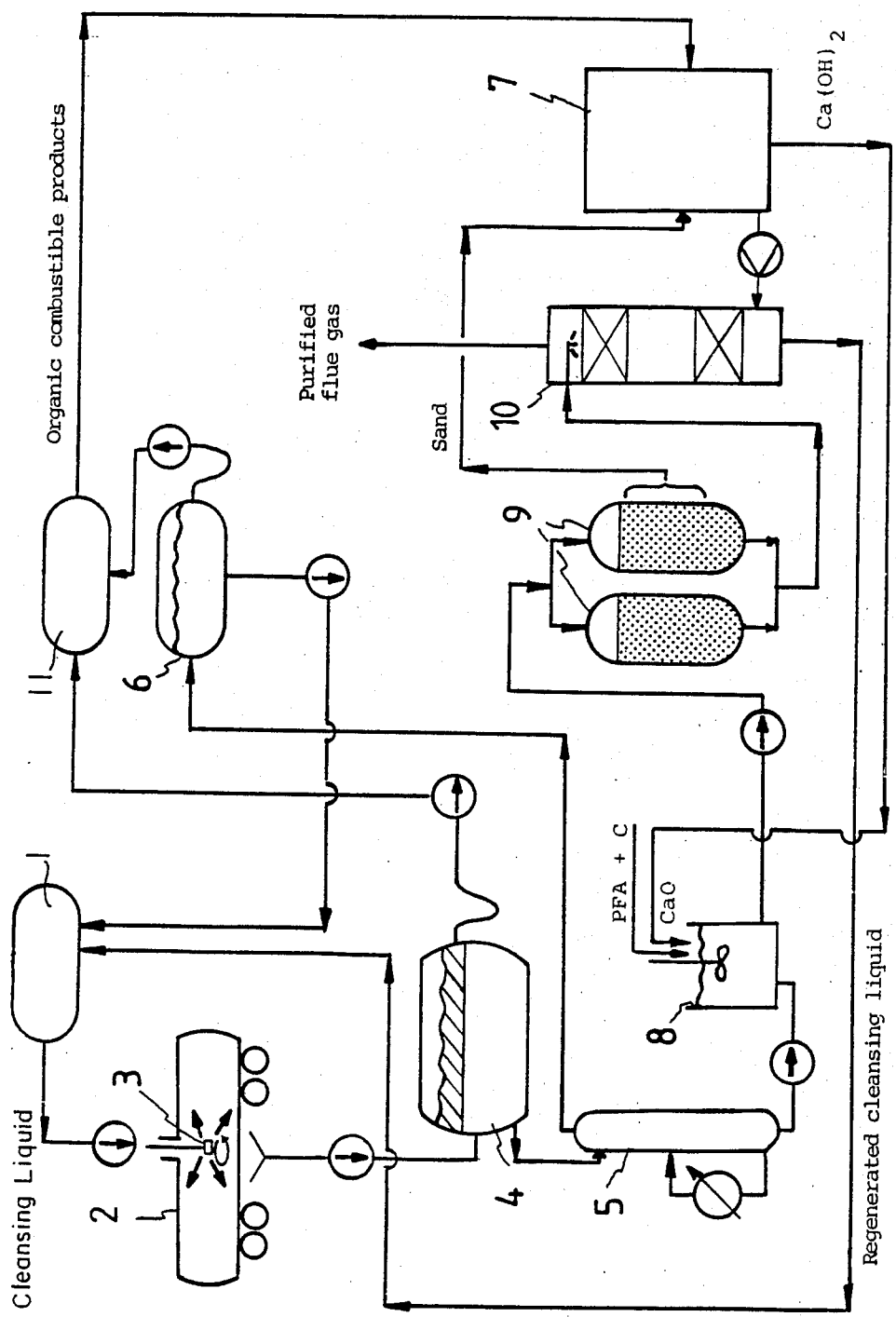

United States Patent [19]

Ahonen

[11] Patent Number: 4,984,593
[45] Date of Patent: Jan. 15, 1991

[54] METHOD AND APPARATUS FOR CLEANING FREIGHT CONTAINERS AS WELL AS FOR TREATING AND CIRCULATING THE FLUIDS USED

[76] Inventor: Heikki Ahonen, Painontie 25, 37630 Valkeakoski, Finland

[21] Appl. No.: 195,887

[22] Filed: May 19, 1988

[30] Foreign Application Priority Data

May 22, 1987 [FI] Finland .................................. 872279

[51] Int. Cl.$^5$ .............................................. B08B 3/10
[52] U.S. Cl. ........................................ 134/13; 134/19
[58] Field of Search ................ 134/13, 19, 22.17, 40, 134/42; 423/234

[56] References Cited

U.S. PATENT DOCUMENTS

| | | | |
|---|---|---|---|
| 1,920,626 | 8/1933 | Bragg | 423/234 |
| 2,324,804 | 7/1943 | Gelderen | 134/22.17 |
| 3,607,482 | 9/1971 | Selm | 134/13 |
| 4,434,069 | 2/1984 | Fairchild | 134/22.17 |
| 4,566,912 | 1/1986 | Borg | 134/13 |

FOREIGN PATENT DOCUMENTS 2179243 10/1985 United Kingdom .

OTHER PUBLICATIONS

Watts, G. "How to Clean a Tank", *Petroleum and Chemical Transporter*, Nov. 58, pp. 7-11.
Hawley G. *The Condensed Chemical Dictionary*, 9th ed., Van Nostrand Rheinhold Company, New York, 1977, pp. 153, 163, 782, 785 and 787.

*Primary Examiner*—Patrick P. Garvin
*Assistant Examiner*—George R. Fourson
*Attorney, Agent, or Firm*—Birch, Stewart, Kolasch & Birch

[57] ABSTRACT

The invention concerns a method and an apparatus for cleaning freight containers and for treating and circulating the cleansing liquids. According to the invention, an aqueous soda-containing solution is used as cleansing liquid, volatile organic substances, if any, are separated from the cleansing liquid in a separation unit (4) and in a distillation unit (5) and the liquid obtained in then treated with lime and carbon-containing fly ash in a mixing unit (8). The impurities of the cleansing liquid are sorbed to the activated carbon and precipitate onto the calcium carbonate. The slurry is filtered and the solid material retained in the filter (9) is further fed to a combustion unit (7). Flue gases formed in the combustion unit (7) are treated with the filtrate, whereby sodium hydroxide in the filtrate is transformed into carbonate form, and may be used as new cleansing liquid in combination with makeup chemicals. The volatile organic compounds are used as fuel in the combustion unit. The invention provides an integrated process, in which waste products may be used for treating cleansing liquids.

14 Claims, 1 Drawing Sheet

METHOD AND APPARATUS FOR CLEANING FREIGHT CONTAINERS AS WELL AS FOR TREATING AND CIRCULATING THE FLUIDS USED

This invention concerns a method for cleaning freight containers, both railway cars and truck trailers, as well as for treating and circulating the fluids used in the cleaning operation.

The invention also concerns an apparatus for treating liquids containing soda and water used in the cleaning of freight containers.

Freight containers on rail and on wheel (tank cars) usually carry only one specific product, in contrast to vehicles for transport of dry goods, which after a relatively simple cleaning procedure may be loaded with almost any product. The main reasons for tank cars having to return empty for a new consignment of the same goods, are that their cleaning has proved very difficult and, furthermore, that the most difficult part of the cleaning process is the appropriate treatment of the waste water formed. Tank cars on rail carry various nutrive fatty acids, fuel oils, heavy, medium heavy and light gasoline, liquified gas, gas, chemicals such as sodium hydroxide, nitric acid, ammonia, sulphuric acid, hydrochloric acid, resinous liquids, such as urea melamine phenol resins, different latexes for the rubber, the paper and the plastics industries, organic chemicals, a large amount of more or less toxic, usually all inflammable ready-to-use chemicals, mixtures such as soaps, printing colours, solvents, spent liquors of the pulp industry, just to mention a few examples This already shows that freight containers carry a large variety of products, and that many of these have to be heated, unloaded when hot, many being very volatile, inflammable and explosive.

The freight containers are cleaned with a cleansing liquid, usually an alkaline liquid containing surfactants.

Organic compounds naturally dissolve only to a small extent in these cleansing liquids; they are always partly emulsified and thus the cleansing liquids withdrawn from the freight container may contain from a few promille up to between 10 and 15 per cent of organic compounds. An appropriate further treatment of these liquids requires that the volatile organic compounds, as well as the emulsified easily volatile organic compounds, be removed from the cleansing liquid. This is most easily done by steam stripping.

In connection with this invention, it was surprisingly found that waste products may be used for the cleaning of freight containers, that is, for the treatment of the wastes in the containers. The procedure is economical and technically operational.

Soda, which may be precipitated with lime compounds, is intentionally used as an alkaline agent in the cleansing liquid. Waste product lime, if readily available, is naturally used for said precipitation operation, but calcium hydroxide may also be used in this context.

All the organic, dissolved and emulsified impurities do not precipitate on the surface of the carbonate crystals formed in the precipitation process Therefore, fly ash with a relatively high content of incombustible carbon, is also added. It is already known in the art that incombustible carbon in fly ash very easily absorbs organic substances In this respect, it resembles so called activated carbon. This kind of fly ash has therefore proved difficult to use, i.e. in the production of cement and concrete. Moreover, it is known that fly ash can be fractioned so that the carbon contained in the fly ash is enriched in the finer fractions.

More specifically, the method according to the invention comprises (a) using an aqueous solution containing soda as cleansing liquid, (b) separating the organic volatile compounds and substances lighter than water, if any, from said cleansing liquid after the cleansing operation, (c) treating the liquid thus obtained with lime and with a product which contains activated carbon, (d) filtering the slurry obtained, (e) subjecting the solids retained in the filter to combustion in order to remove organic impurities and carbon, (f) treating the filtrate with flue gases formed during combustion in order to convert at least some of the sodium hydroxide in said filtrate to sodium carbonate, and (g) circulating the liquid obtained and using it, possibly in combination with makeup chemicals, as cleansing liquid.

The apparatus according to the invention comprises, in its turn, a first separation tank for separating a fraction lighter than water from the cleansing liquid used for cleaning the freight container, a distillation unit for removing water-emulsified compounds, if any, a precipitation unit equipped with means for feeding lime as well as an activated carbon product into said unit, a filter for filtering the slurry obtained from the precipitation unit, a combustion unit for treating the solids-containing precipitates from said filter, a scrubber for cleaning the flue gases of the combustion unit by using the filtrate obtained from said filter, as well as means for connecting in series said first separation tank, said distillation unit, said precipitation unit and said filter, and means for connecting said combustion unit and said scrubber in parallel with said filter.

Considerable benefits are achieved by means of the invention.

Thus, an integrated process is provided, in which all wastes are reused, the cleansing liquids and their heat content are circulated, without causing any load to the waste waters or the atmosphere. A unit that operates according to the method is able to treat cleansing liquids containing organic compounds in volatile, non-volatile or emulsified form, or in any solid form suspended in water Furthermore, no risk of fire or explosion is in any stage of the process involved to the unit or the freight container.

In the following, the invention is more closely illustrated by the following description with reference to the accompanying drawing, which represents a schematic flow diagram of the method according to the invention.

A liquid solution of sodium carbonate, which also contains surfactants, such as sulphonated alkyl aryl compounds or lignosulphonate acids or sulphonated fatty acids, is used as cleansing liquid for a freight container. The cleansing liquid is pumped from its container 1 to a washing means 3 placed in the freight container 2. The washer may either be installed in fixed position, or fitted for movement within the container on wheels or track belts. The freight container may naturally also be completely manually washed.

The used cleansing liquid, which contains dissolved inorganic compounds, emulsified organic compounds and solid precipitates, is then conducted via a duct to a separation tank 4, in which the organic phase lighter than water is separated upon standing The aqueous phase is, in its turn, pumped to a distillation column 5, in which a part of the feed water is vaporized, a large fraction of the remaining organic substances being vaporized and distilled together with the water vapour. These organic substances, which constitute the overhead product of the stripping process, are further decanted in another separation tank (decanter) 6, and the upper layer, that is the organic fraction, is combined in an intermediary tank 11 with the organic fraction obtained from the separation tank 4. The combined fractions are fed to a combustion unit 7, where they are used as fuel. Preferably, the combustion unit comprises a fluidized bed combustion unit.

The bottom product of the distillation column 5, containing low-volatile, that is high-molecular weight organic compounds, resins, tars, precipitates, etc., is conducted to the following treatment in a tank 8 equipped with an impeller, where said substances are precipitated. During the precipitation process, calcium hydroxide and fly ash with a high carbon content are introduced into the mixing tank 8. The content of incombustible carbon in the fly ash used should be at least 3%, preferably at least 15%. Instead of fly ash some other similar activated waste carbon product or, alternatively, ordinary activated carbon may be used.

Sodium carbonate reacts with calcium hydroxide giving calcium carbonate, which is precipitated and deposited on the bottom of the mixing tank 8, and sodium hydroxide, which remains in the aqueous phase.

The mixed slurry containing precipitates is conducted from the tank 8 to a filter 9. The filter may comprise, e.g, a sand filter or a pressure filter The sand filtering apparatus preferably consists of two separate units, one of them being regenerated while the other one is operating. The sand filter may be of any type of apparatus known per se. In the process according to the invention, the cycle time of a pressure filter is rather short, typically, between 10 and 20 minutes Even one filter unit is, in this case, enough. A preferable pressure filtering apparatus is supplied by Larox Oy, Lappeenranta, Finland.

Unexpectedly, it was found that the filterability of the precipitate-containing slurry from tank 8 is extremely good when using a pressure filter Comparative filtering tests have demonstrated that, for this slurry the filtering capacity of a pressure filter is as much as 20 times as high as the average filtering capacity of the filter, and 10 times as high as the one previously achieved when filtering a slurry of fly ash and water. We do not yet completely understand all the reasons underlying this phenomenon, but it is possible that the small calcium carbonate crystals hinder clogging of fly ash particles and thus greatly improve the filterability.

According to the invention, the jammed filter 9 is blown with air to displace as much residual liquid as possible The sand of the sand filter is fed into the combustion unit 7. According to one mode of application, which comprises using a fluidized bed combustion unit, the sand from the filter 9 is used as the material for the fluidized bed in the combustion unit. Thus, the combustible organic impurities in the sand are properly combusted, the sand is regenerated and the calcium carbonate in the sand is regenerated as well. Because of its fine structure, the regenerated calcium oxide may be separated from the sand in said process and, according to the invention, returned to the precipitation process.

When a pressure filter is used, the sand need not be circulated between the fluidized bed combustion process and the pressure filter.

The sodium hydroxide in the filtrate of the filtration process is then reconverted to sodium carbonate for use in the following cleaning operation According to the present invention, the conversion is ideally and integratedly done by treating said liquid in an absorber or scrubber 10 with flue gases of the above-mentioned combustion process, whereupon carbonation reoccurs This provides also for the complete cleaning of the flue gas of said process. Only excess fly ash remains, the fly ash being free of carbon and thus more suitable for use, e.g., in the production of concrete and cement.

It is clear that substances such as glycols, sugars, soaps, etc., that are completely soluble in water, are not easily precipitated. This applies in particular to their low-molecular weight fractions. It is advisable to construct a separate cleansing liquid tank and a small evaporation unit for these substances, and to combust the evaporation residue in said combustion unit.

The cleansing liquid circulates continuously between the cleaning-filtering-caustisation part of the process and the flue gas absorption part of the process. Further, some of the cleansing water remains in the moist sand, from which it is evaporated during combustion, and further, some of the water is removed during flue gas absorption. Thus completely clean rinsing water, for which there is always a need, may be introduced in the water balance. This introduction of water does not, either, cause any waste water emissions.

The filtrate which has been treated with flue gases may be used as such for the cleaning operation. However, makeup chemicals (and water as indicated above) may also be admixed before the liquid is recirculated.

It has been calculated that the present process is self-sufficient as regards heat, if 200 kg of essentially water-insoluble organic oily substances are removed from each freight container by cleaning.

Within the scope of the present invention, several alternative embodiments of the invention differing from the one presented in the above flow diagram are conceivable. Thus, in addition to the preferred fluidized bed combustion unit, other furnaces and combustion apparatus may be used for combusting the solids obtained from filtration. Furnaces using electric energy and as well as fuel-fired furnaces may be used, such as various plasma ovens and rotary kilns. In connection with the combustion process, it is important that the combustion of the organic impurities and the carbon contained in the solids is as complete as possible.

According to the invention, the cleansing liquid container 1, the separation tanks 4 and 6, respectively, the distillation unit 5, the mixing tank 8 and the filter 9 may also be installed in a mobile unit, which may be driven close to the object that is to be cleaned. The filter cakes from the filter 9 is combusted and destroyed in a separate fixed combustion unit 7. This embodiment enables the cleaning of freight containers, which cannot be transported to the process.

EXAMPLE 1

An oily sludge was prepared from the following components:

| Water | 150 liters |
|---|---|
| Waste oil "Nefteslam, NL" | 6.5 kg |
| Heavy fuel oil (SNO-NL) | 5.4 kg |
| Oily condensate NL | 4.0 kg |

This mixture was mixed in a barrel with a high-speed turbine impeller and heated to 56° C. for 20 minutes After this period, 3.0 kg of soda was admixed and mixing was continued for another 5 minutes.

At the end of said time, excess oil was allowed to separate and raise to the surface. Thereafter, 95% of the oil was removed from the surface by vacuum suction. The surface still had a thin, almost continuous oil film. The aqueous phase in the rest of the barrel contained 84 mg of oil per liter. The analysis of the oil content was performed by the chloroform-extraction method known per se and samples were taken 2 hours after clarification.

An amount of 1.60 kg of slaked lime was admixed with the solution. Mixing was continued for 10 minutes after the addition. A sample was taken and transferred into a measuring cylinder, the calcium carbonate being allowed to precipitate and settle in the measuring cylinder for 5 minutes. A sample taken from the settled aqueous phase was analyzed. It was found that the sample still contained 7 mg oil per liter; the main part of the oil was adsorbed on the surface of the precipitated and settled carbonate.

Fly ash (1.5 kg) having a carbon content of 20.3 LOI (loss of ignition) was added to the barrel that still contained the carbonate precipitate mixture, which was being mixed Mixing was continued for 3 minutes and the mixture was filtered through a pressure filter for 10 minutes A completely clear filtrate free of any smell of oil was obtained. The pH of the filtrate was 11.3.

The filtrate was analyzed for remaining oil with the $CCl_4$-extraction-method. The oil-content was found to be less than 1 mg/l, i.e. within the limits of the measuring accuracy of the method. During sampling, PE plastic bottles had been used. Samples taken of the bottles gave a detectable extract having an oil-content of less than 1 mg/l.

EXAMPLE 2

In accordance with the procedure of Example 1, an oily mixture was prepared having the same composition as above except for the additional components of 250 g of sunflower oil and 380 g of treacle (50% sugar).

The mixture was treated as described in Example 1, an analysis of the filtrate from the pressure filter showing that the oil content was still less than 1 mg/l. The sugars added to the mixture had not been adsorbed, i.e. the concentration thereof corresponded to the calculated amount.

EXAMPLE 3

Hydrogen peroxide having a concentration of 30%, was admixed with the remaining 115 liters of the solution prepared according to Example 2, in order to oxidize the sugars. The hydrogen peroxide was added in an amount exceeding the theoretically calculated equivalent amount by 10%. Upon filtration samples were taken and the oil and sugar contents determined The analysis showed that the total amount of sugars in the filtrate was half the original amount, the oil content still being less than 1 mg/l.

EXAMPLE 4

Fluidized bed combustion

The filter cake from Example 1 (moisture 20%) was combusted in a 1 MW fluidized bed furnace at 860° C. Samples of the solid matter in the flue gases contained particles of the original fly ash and finely divided particles of CaO, the diameter of the latter being about ¼ of that of the former No traces of carbon or oil could not be found in the solid matter samples collected from the flue gases after combustion.

EXAMPLE 5

Cleaning of a freight container

A railway car, which had transported soya oil, was cleaned with a cleansing liquid containing 0.3 g/l alkyl aryl sulphonates and 20 g/l soda (sodium carbonate). Approximately 3,000 l/h of liquid was used, at a temperature of ca 90° C. About 50 kg of soya oil, which had been emulsified in the presence of surfactants, was obtained from the car, as well as ca. 40 kg of various unidentified precipitates The used cleansing liquid was fed into the separation tank, where the oil phase was separated from the liquid upon standing. The aqueous phase was directly conducted to the mixing tank, where 40 kg/l of fine textured fly ash containing ca. 14% incombustible carbon was added, as well as an equivalent amount of lime (ca. 32 kg/l, when expressed as calcium oxide). The liquid containing precipitates and calcium carbonate was pumped to the sand filter, where the solid substances were removed.

The impurities present in the cleansing liquid in the precipitation process were so efficiently sorbed onto the calcium carbonate and fly ash particles that the water in circulation after filtering was only slightly opaque. Therefore, the circulating water could be reused both for a similar and a different cleaning process.

After filtering, the sand with its impurities was transferred to the fluidized bed combustion unit, the calcium carbonate separated from the sand was returned to the precipitation process, and the sodium hydroxide from the cleansing liquid was conducted to the scrubber (gas cleaner), where it was converted into sodium hydroxide.

I claim:

1. A method for cleaning freight containers and for treating and circulating the liquids used in the cleaning operation, which comprises:
    (a) using an aqueous solution containing soda as a cleansing liquid in a cleansing operating in a freight container,
    (b) separating the resulting organic volatile compounds and substances lighter than water, if any, from said cleansing liquid used in the cleansing operation of step (a) to form a first liquid,
    (c) treating said first liquid obtained from step (b) with lime or calcium hydroxide and with a product which contains activated carbon to form a slurry,
    (d) filtering said slurry obtained from step (c), so as to retain solids therefrom in a filter and so as to collect a filtrate, (e) subjecting the solids retained in said filter to combustion in order to remove organic impurities and carbon, (f) treating the filtrate of step (d) with flue gases formed during the combustion in step (e) in order to convert sodium hydroxide in said filtrate back to sodium carbonate and so as to form a second liquid, and (g) circulating said second liquid obtained from step (f) and using it again as cleansing liquid in step (a).

2. The method according to claim 1, wherein step (b) is carried out by decanting said cleansing liquid.

3. The method according to claim 1, wherein step (b) is carried out by distilling said cleansing liquid.

4. The method according to claim 1, wherein calcium oxide which is regenerated during combustion in step (e) is collected and recirculated for use in step (c).

5. The method according to claim 1, wherein said slurry is filtered in step (d) by means of sand.

6. The method according to claim 5, wherein the resulting solids-containing sand is used as fluidized bed in a fluidized bed combustion unit in step (e).

7. The method according to claim 6, wherein said activated carbon product comprises fly ash that in itself contains at least 15% incombustible carbon.

8. The method according to claim 1, wherein said slurry is filtered in step (d) by means of a pressure filter.

9. The method according to claim 8, wherein the filter cake obtained from the filtration is combusted in a fluidized bed combustion unit.

10. The method according to claim 9, wherein said activated carbon product comprises fly ash that in itself contains at least 15% incombustible carbon.

11. The method according to claim 1, wherein said activated carbon product comprises fly ash that in itself contains at least 3% (incombustible carbon).

12. The method according to claim 1, wherein said activated carbon product comprises activated carbon separated from fly ash originating in coal combustion.

13. The method according to claim 1, which further comprises adding makeup chemicals and water to the liquid from step (f).

14. The method according to claim 1, wherein said activated carbon product comprises fly ash that in itself contains at least 15% incombustible carbon.

* * * * *